United States Patent [19]

Machado et al.

[11] Patent Number: 4,711,758

[45] Date of Patent: Dec. 8, 1987

[54] SPENT FUEL STORAGE CASK HAVING BASKET WITH GRID ASSEMBLIES

[75] Inventors: Octavio J. Machado; David A. Daugherty, both of Pensacola; Ronnie H. Andrews, Cantonment; Larry E. Efferding, Pensacola, all of Fla.

[73] Assignee: Westinghouse Electric Corp., Pittsburgh, Pa.

[21] Appl. No.: 703,855

[22] Filed: Feb. 21, 1985

Related U.S. Application Data

[63] Continuation-in-part of Ser. No. 686,041, Dec. 24, 1984, abandoned.

[51] Int. Cl.[4] .......................... G21C 19/32; G21F 5/00
[52] U.S. Cl. .................................... 376/272; 376/285; 250/507.1
[58] Field of Search ............... 376/272, 462, 445, 285, 376/302, 441, 442, 438; 250/506.1, 507.1

[56] References Cited

U.S. PATENT DOCUMENTS

| | | | |
|---|---|---|---|
| 3,142,627 | 7/1964 | Emerson | 376/442 |
| 3,600,276 | 8/1971 | Nims, Jr. | 376/445 |
| 3,713,974 | 1/1973 | Previti et al. | 376/442 |
| 3,719,560 | 3/1973 | Mayers et al. | 376/445 |
| 4,021,204 | 5/1977 | Straffi | 376/462 |
| 4,066,500 | 1/1978 | Woltron et al. | 376/462 |
| 4,146,430 | 3/1979 | Berringer | 376/302 |
| 4,197,467 | 4/1980 | Williams | 250/507.1 |
| 4,330,711 | 5/1982 | Ahner et al. | 250/506.1 |
| 4,371,035 | 2/1983 | Soligno | 376/462 |
| 4,399,366 | 8/1983 | Bucholz | 250/507.1 |
| 4,478,786 | 10/1984 | Andersson et al. | 376/434 |
| 4,488,048 | 12/1984 | Bienek et al. | 376/272 |
| 4,543,488 | 9/1985 | Diem | 250/507.1 |

FOREIGN PATENT DOCUMENTS

| | | | |
|---|---|---|---|
| 1488523 | 6/1967 | France | 376/462 |
| 2258692 | 8/1975 | France | . |
| 2384327 | 10/1978 | France | . |
| 2433816 | 4/1980 | France | 376/272 |
| 2480984 | 10/1981 | France | . |
| WO80/02469 | 11/1980 | PCT Int'l Appl. | . |

Primary Examiner—Deborah L. Kyle
Assistant Examiner—Daniel Wasil
Attorney, Agent, or Firm—Daniel C. Abeles

[57] ABSTRACT

A cask for storing spent nuclear fuel after removal from a pool of water includes a container with a cylindrical cavity and a basket which is inserted into the container. The basket includes disk-like grid assemblies which provide spent fuel storage slots and which are coaxially mounted at spaced-apart positions, each grid assembly having a diameter that is slightly less than the one above it. If fuel assemblies are to be stored, hollow cells are affixed to one of the grid assemblies and positioned in the others by heat-conducting wedges which permit the basket and cells to expand at different rates. Rings which project slightly into the interior of the container are provided on the container walls, each ring being positioned to be in alignment with the periphery of a corresponding grid assembly after the basket is inserted into the container. Like the grid assemblies, each ring has a diameter that is slightly less than the ring above it, and moreover the diameter of each ring is slightly greater than the diameter of the corresponding grid assembly. These stepped diameters reduce the possibility that the basket might become jammed during the insertion process due to slight misalignment of the basket. After insertion, temperature changes expand the grid assemblies into pressing contact with the rings in order to transfer heat from the spent fuel to the container walls.

19 Claims, 15 Drawing Figures

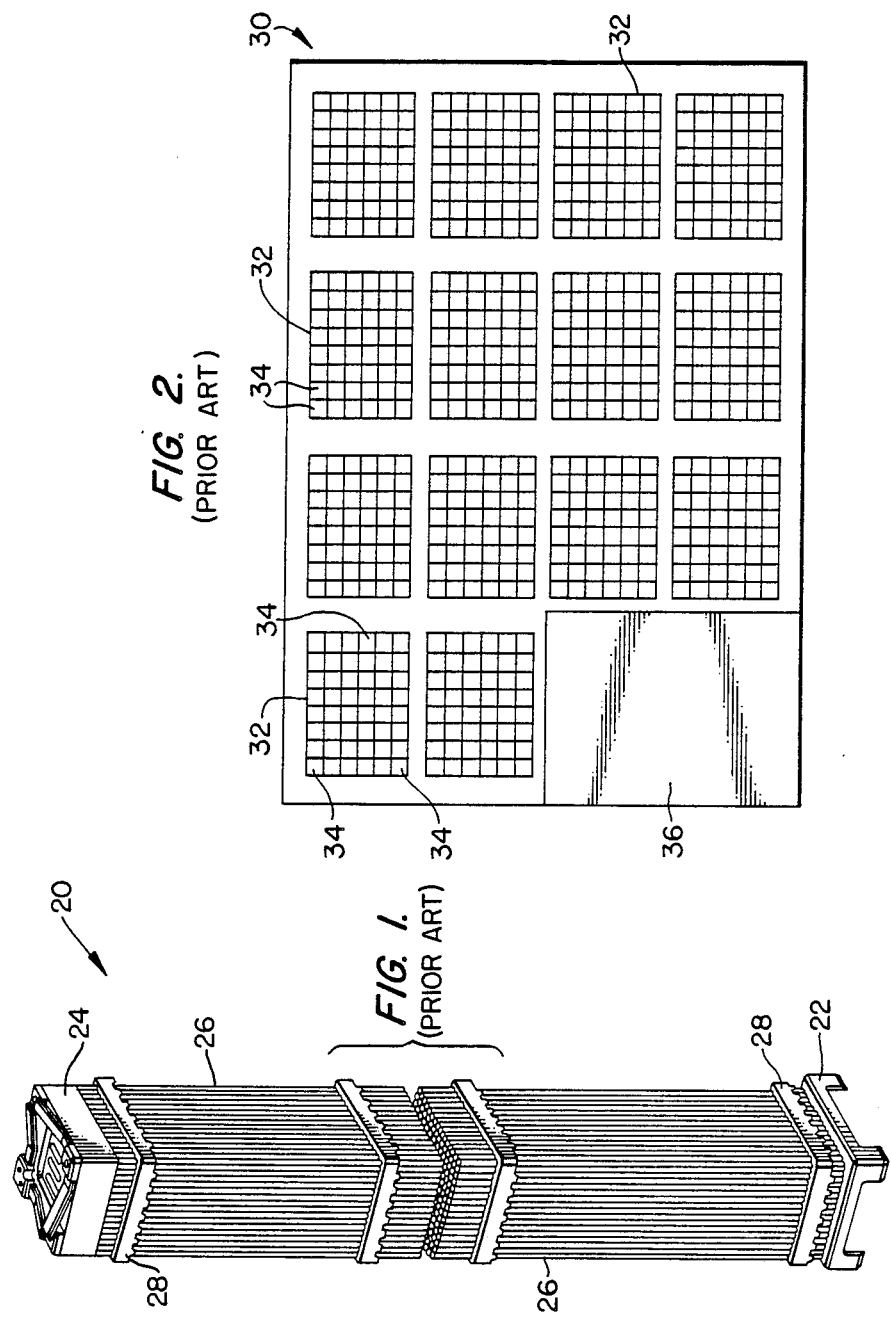

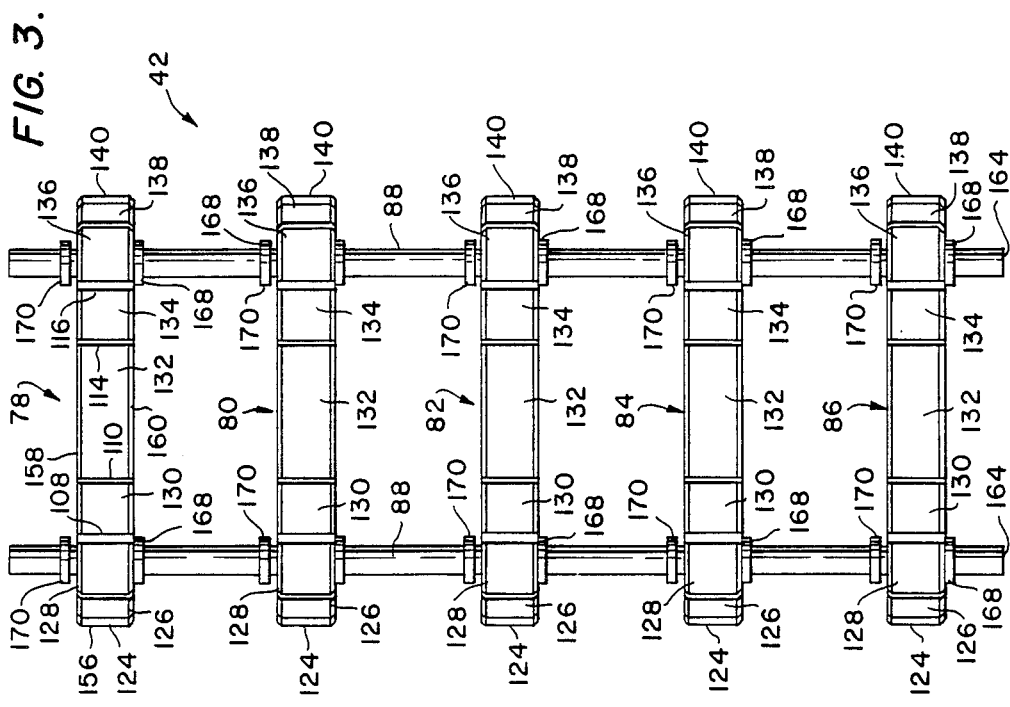

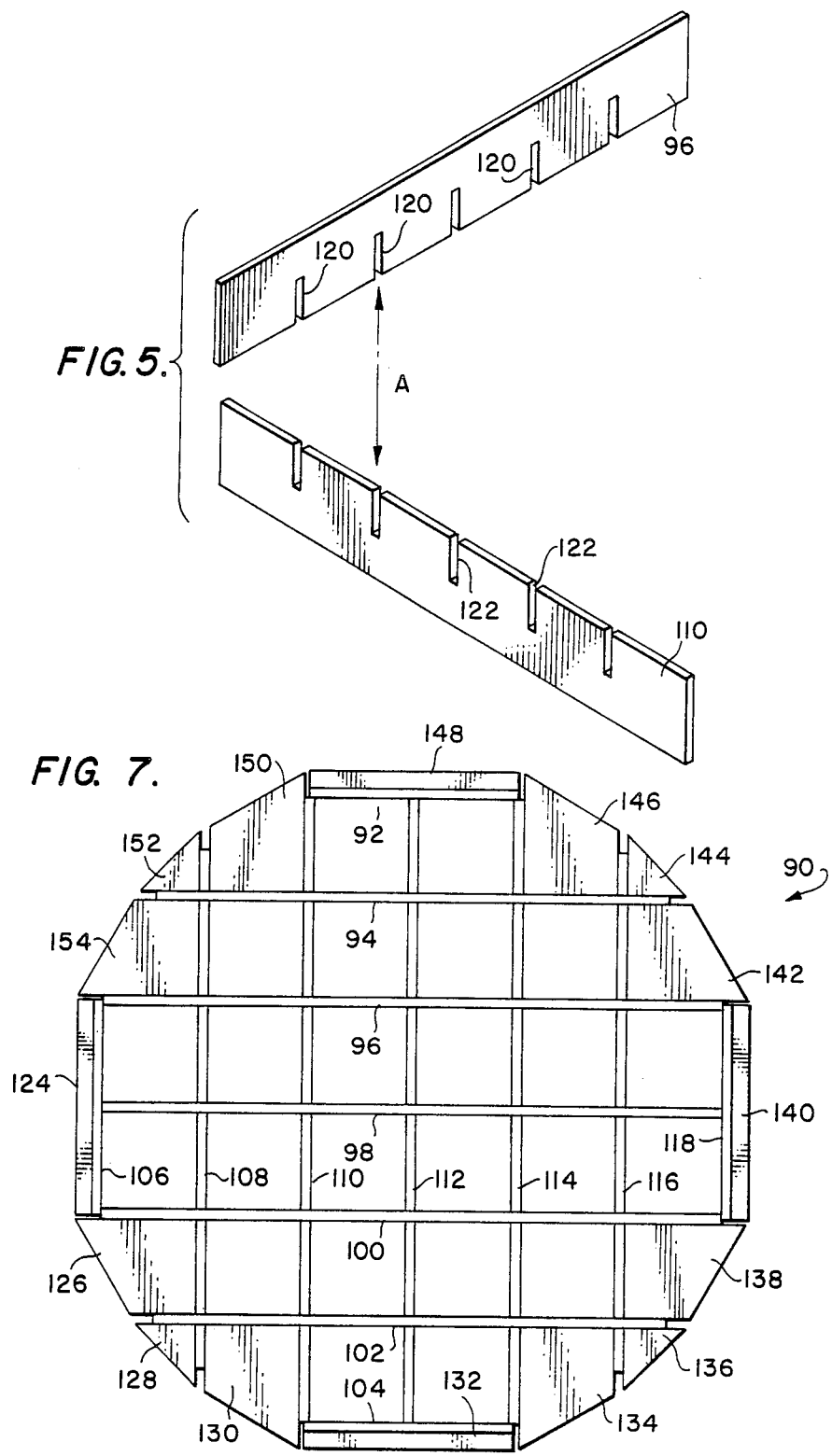

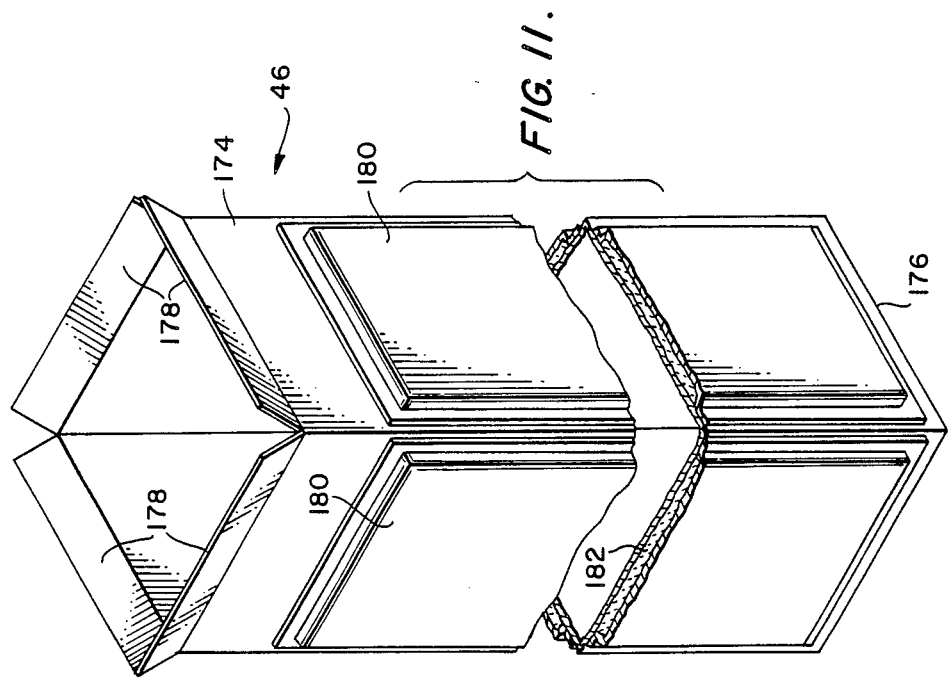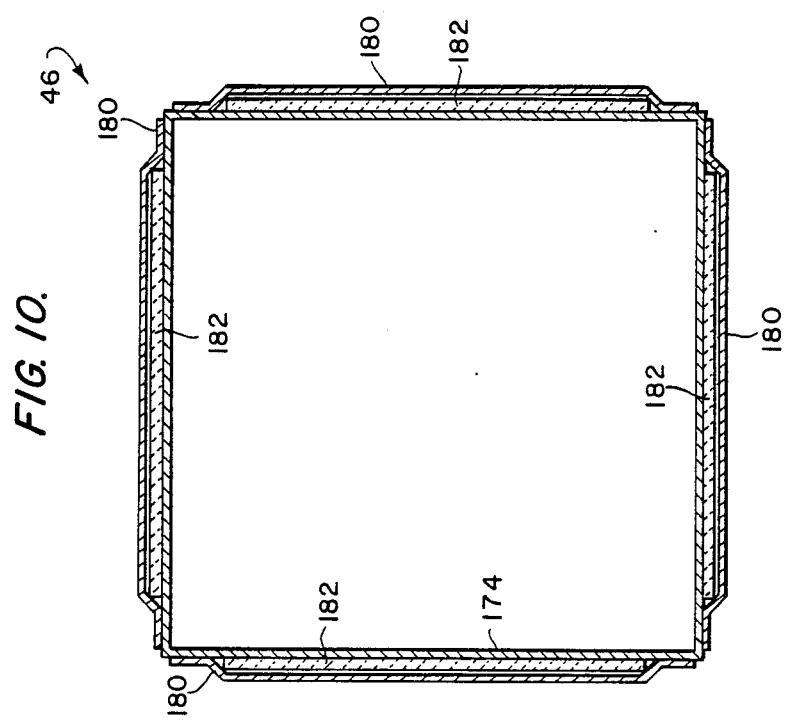

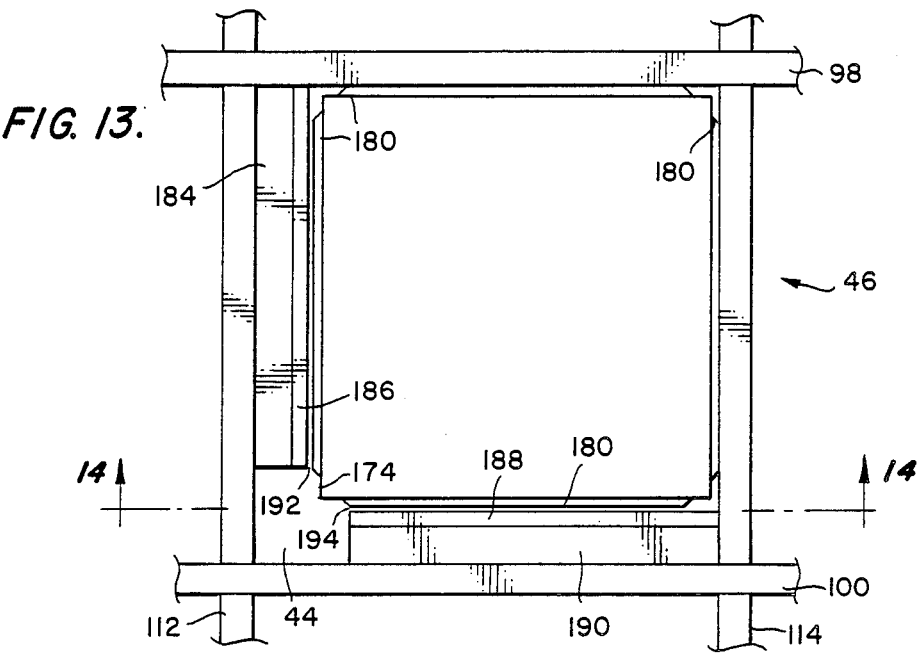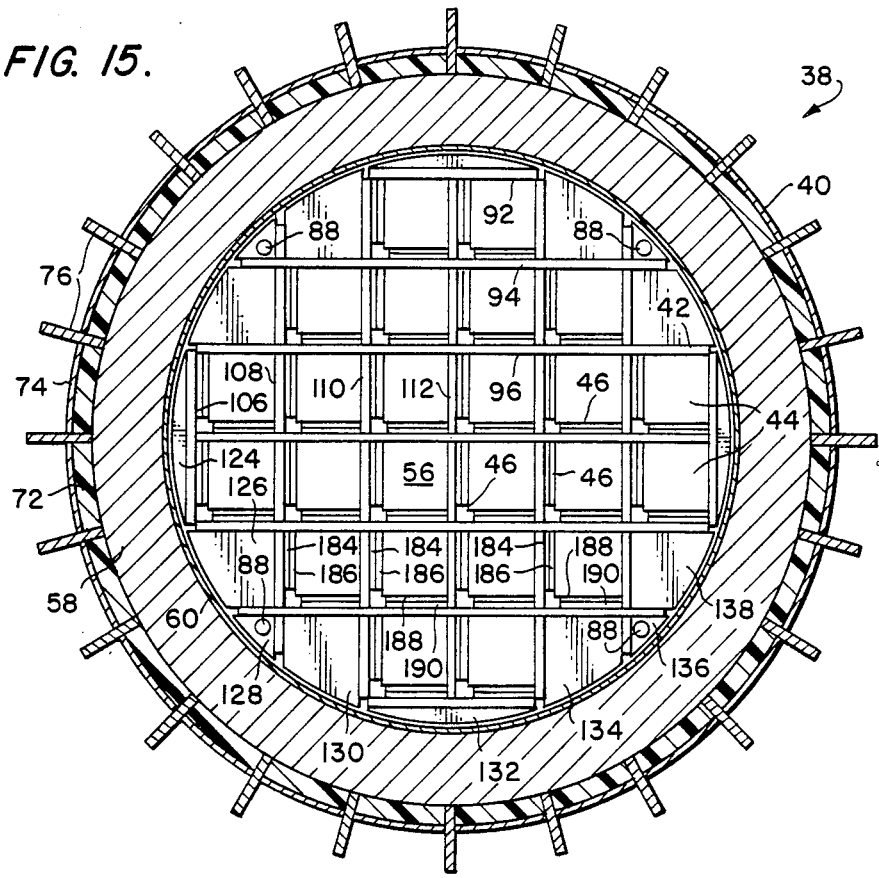

SPENT FUEL STORAGE CASK HAVING BASKET WITH GRID ASSEMBLIES

CROSS-REFERENCE TO RELATED APPLICATION

This is a continuation-in-part of application Ser. No. 686,041, filed Dec. 24, 1984, now abandoned.

BACKGROUND OF THE INVENTION

The present invention is related to the long-term storage of spent fuel that has been removed from a nuclear reactor, and more particularly, to a spent fuel storage cask having a basket which supports the spent fuel and which dissipates heat generated by the spent fuel. The basket includes a plurality of grid assemblies which provide storage slots for the spent fuel and which conduct heat to the walls of the cask.

FIG. 1 illustrates a typical fuel assembly 20 for supplying nuclear fuel to a reactor. Assembly 20 includes a bottom nozzle 22 and a top nozzle 24, between which are disposed elongated fuel rods 26. Each fuel rod 26 includes a cylindrical housing made of a zirconium alloy such as commercially available "Zircalloy-4", and is filled with pellets of fissionable fuel enriched with U-235. Within the assembly of fuel rods 26, tubular guides (not shown) are disposed between nozzles 22 and 24 to accommodate movably mounted control rods (not illustrated) and measuring instruments (not illustrated). The ends of these tubular guides are attached to nozzles 22 and 24 to form a skeletal support for fuel rods 26, which are not permanently attached to nozzles 22 and 24. Grid members 28 have apertures through which fuel rods 26 and the tubular guides extend to bundle these elements together. Commercially available fuel assemblies for pressurized water reactors include between 179 and 264 fuel rods, depending upon the particular design. A typical fuel assembly is about 4.1 meters long, about 19.7 cm wide, and has a mass of about 585 kg, but it will be understood that the precise dimensions vary from one fuel assembly design to another.

After a service life of about 3 years in a pressurized water reactor, the U-235 enrichment of a fuel assembly 20 is depleted. Furthermore, a variety of fission products, having various half-lives, are present in rods 26. These fission products generate intense radioactivity and heat when assemblies 20 are removed from the reactor, and accordingly the assemblies 20 are moved to a pool containing boron salts dissolved in water (hereinafter "borated water") for short-term storage. Such a pool is designated by reference number 30 in FIG. 2.

Pool 30 is typically 12.2 meters deep. A number of spent fuel racks 32 positioned at the bottom of pool 30 are provided with storage slots 34 to vertically accommodate fuel assemblies 20. A cask pad 36 is located at the bottom of pool 30.

During the period when fuel assemblies 20 are stored in pool 30, the composition of the spent fuel in rods 26 changes. Isotopes with short half-lives decay, and consequently the proportion of fission products having relatively long half-lives increases. Accordingly, the level of radioactivity and heat generated by a fuel assembly 20 decreases relatively rapidly for a period and eventually reaches a state wherein the heat and radioactivity decrease very slowly. Even at this reduced level, however, rods 26 must be reliably isolated from the environment for the indefinite future.

Dry storage casks provide one form of long-term storage for the spent fuel. After the heat generated by each fuel assembly 20 falls to a predetermined amount—such as 0.5 to 1.0 kilowatt per assembly, after perhaps 10 years of storage in pool 30—an opened cask is lowered to pad 36. By remote control the spent fuel is transferred to the cask, which is then sealed and drained of borated water. The cask can then be removed from pool 30 and transported to an above-ground storage area for long-term storage.

The requirements which must be imposed on such a cask are rather severe. The cask must be immune from chemical attack during long-term storage. Furthermore, it must be sufficiently rugged mechanically to avoid even tiny ruptures or fractures during long-term storage and during transportation, when the cask might be subjected to rough treatment or accidents such as drops. Moreover, the cask must be able to transmit heat generated by the spent fuel to the environment while nevertheless shielding the environment from radiation generated by the spent fuel. The temperature of the rods 26 must be kept below a maximum temperature, such as 375° C., to prevent deterioration of the zirconium alloy housing. Provisions must also be made to ensure that a chain reaction cannot be sustained within the cask; that is, that the effective criticality factor $K_{eff}$ remains less than one so that a self-sustaining reaction does not occur. These requirements impose stringent demands upon the cask, which must fulfill its storage function in an utterly reliable manner.

SUMMARY OF THE INVENTION

Accordingly, one object of the present invention is to provide a mechanically rugged storage cask which prevents fission products and radiation from escaping into the environment while dissipating heat generated by spent fuel.

Another object of the present invention is to provide a storage cask having a basket with a plurality of grid assemblies for supporting spent fuel, either in the form of fuel assemblies or consolidated fuel, or both, and for conducting heat generated thereby to the walls of the cask.

Another object of the present invention is to provide a storage cask having a basket with disk-shaped grid assemblies which are spaced apart from one another in a column and which expand, after the basket is inserted into a container to form the cask, so that they come into contact with corresponding rings on the interior walls of the container in order to transmit heat from the basket to the rings, the diameters of the grid assemblies in the column and their corresponding rings decreasing slightly from the top of the column to the bottom in order to facilitate insertion of the basket into the container.

Another object of the present invention is to provide a basket having legs which support grid assemblies at spaced-apart positions, the grid assemblies being movably mounted on the legs by top and bottom rings which are affixed to the legs and which are spaced further apart than the thickness of the grid assemblies.

Another object of the present invention is to provide heat-transmitting wedges for positioning cells within the basket while permitting differential expansion of the cells with respect to the basket, the cells in turn enclosing spent fuel assemblies.

These and other objects can be attained by providing a container having a cavity defined by substantially cylindrical walls. A basket disposed in the cavity has a plurality of substantially disk-shaped grid assemblies which are mounted at different vertical positions above the container floor. Each grid assembly includes plates which are joined together to provide a matrix of apertures and metal elements which are affixed to the plates to provide a substantially circular periphery. The apertures provided by the matrixes of the grid assemblies are aligned to provide storage slots for accepting spent fuel. When the cask elements are fabricated at normal shop temperatures, the diameters of the grid assemblies are slightly less than the diameter of the inner cask wall, so that the basket can be inserted into the container. When spent fuel is loaded and stored, however, the temperature within the cask rises and the grid assemblies expand with respect to the container so that the peripheries of the grid assemblies come into heat-conducting contact with the container walls.

In accordance with one aspect of the invention, the container walls include vertically spaced rings which project slightly into the cavity. Each ring corresponds to a grid assembly and is positioned adjacent the periphery of the corresponding grid assembly. At the time of fabrication the diameter of a ring is slightly (e.g., about 0.3 cm) greater than the diameter of the corresponding grid assembly, and in order to alleviate the risk that the basket might jam while it is being inserted into the container, the diameter of each grid assembly and the diameter and of its corresponding ring are slightly less than the diameters of the grid assembly and ring above it. The changing diameters not only afford a greater latitude for error during the initial stages of insertion, they also provide visual guides for correcting the alignment as the insertion process progresses.

In accordance with another aspect of the invention, the basket includes legs to which the grid assemblies are mounted at spaced-apart positions. Four of the metal elements of each grid assembly are provided with holes through which the legs extend. The grid assemblies are confined between top and bottom rings affixed to the legs on either side of the holes. The distance between the rings is slightly greater than the thickness of the grid assemblies in order to permit differential expansion of the elements as the temperature within the cask rises.

In accordance with another aspect of the invention, open-ended cells for enclosing fuel assemblies can be inserted into the storage slots of the basket. Each cell has four walls which have dimensions corresponding to those of the fuel assembly to be enclosed and which support "neutron poison." The cells are positioned in the storage slots by heat-conducting wedges which are welded to the plates of the grid assemblies and which are spaced apart slightly from two of the cell walls. This slight spacing allows differential expansion of the cells with respect to the basket but permits transfer of heat to the basket, particularly if the cask is flooded with helium.

In accordance with yet another aspect of the invention, the rings on the container wall are wider than the thicknesses of the corresponding grid assemblies, and moreover beveled surfaces are provided on both the rings and the peripheries of the grid assemblies in order to facilitate insertion and/or removal of the basket.

BRIEF DESCRIPTION OF THE DRAWINGS

FIG. 1 is a perspective view of a typical fuel assembly;

FIG. 2 is a top plan view of a pool for short-termed storage of spent fuel assemblies;

FIG. 3 is a front elevational view of a basket, and illustrates grid assemblies which are mounted at spaced-apart positions on legs;

FIG. 4 is a top plan view of plates connected to provide a matrix of apertures for a grid assembly;

FIG. 5 is an exploded perspective view illustrating how two of the plates of FIG. 4 are connected in order to provide the matrix;

FIG. 7 is a top plan view of the matrix of FIG. 4 and metal blocks which are attached thereto to provide a roughly circular periphery;

FIG. 10 is a sectional view of a cell for receiving a spent fuel assembly;

FIG. 11 is a perspective view of the cell of FIG. 10;

FIG. 13 is a top plan view schematically illustrating a cell which is positioned by heat conducting wedges affixed to a grid assembly;

FIG. 15 is a sectional view, taken along a plane perpendicular to the paper of FIG. 6, of a cask which includes a container with a basket having cells mounted therein.

DESCRIPTION OF THE PREFERRED EMBODIMENTS

Figure 6:
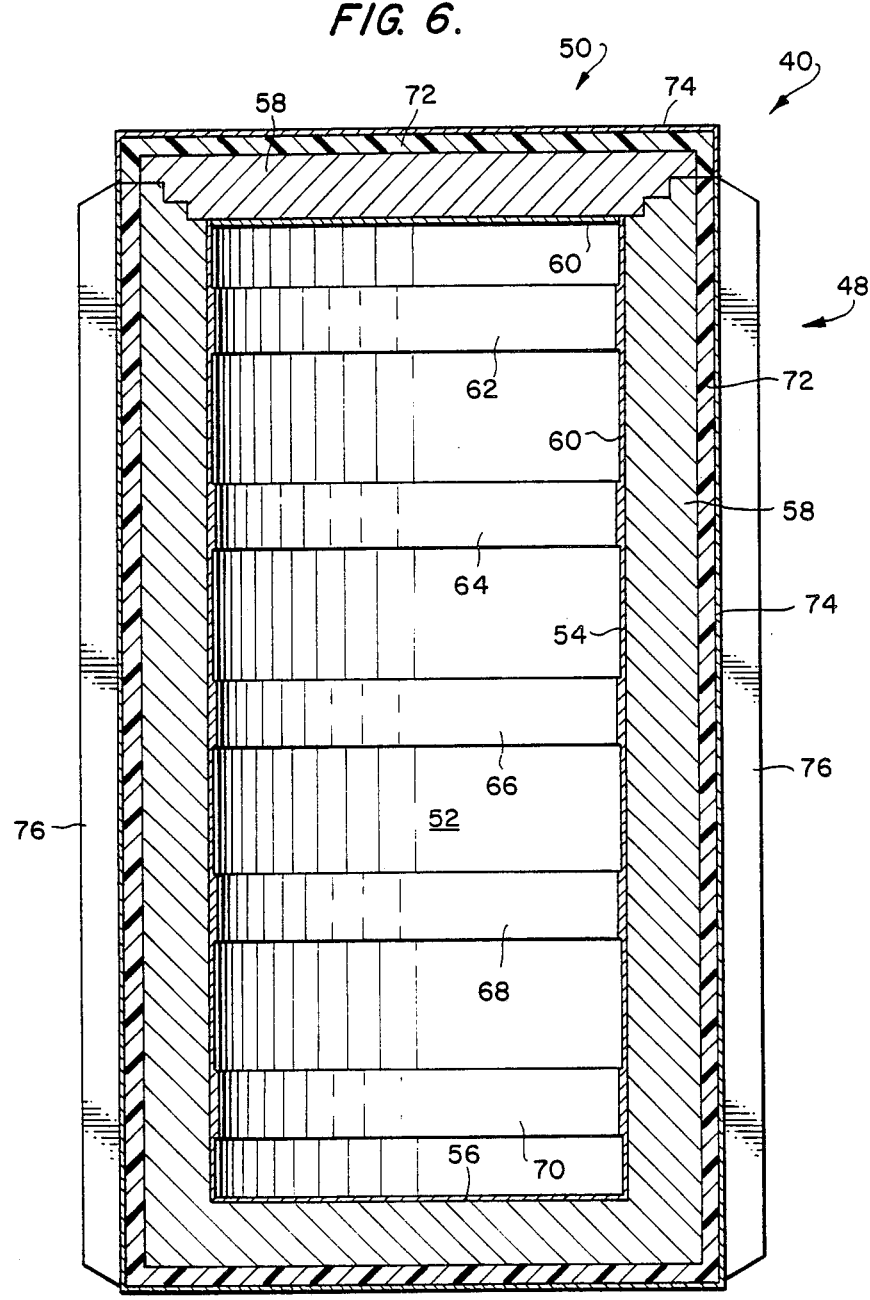
FIG. 6 is a vertical sectional view of a container, and illustrates rings which form part of the inner wall of the container and which project slightly into the interior thereof.
Figure 8:
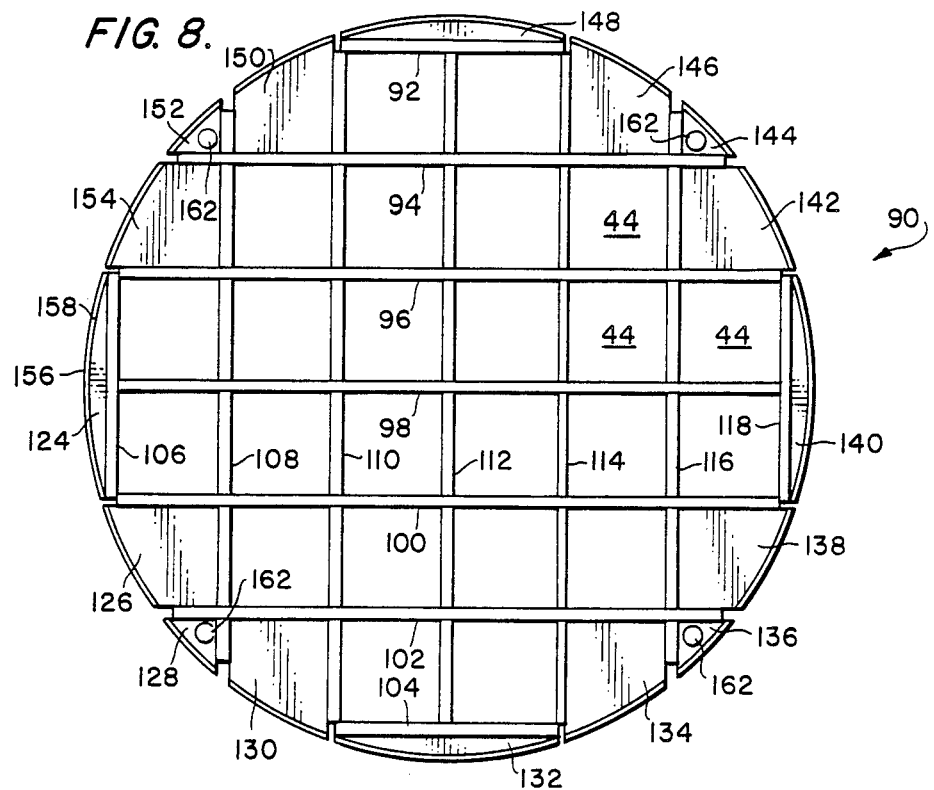
FIG. 8 is a top plan view of a completed grid assembly after its periphery has been machined into a circular shape and holes have been drilled to accommodate legs.

With initial reference to FIG. 15, the cask 38 of the present invention includes a generally cylindrical container 40 having a basket 42 disposed therein. Basket 42 provides an array of storage slots 44, configured much a matrix of vertically disposed pigeon holes, each accommodating a cell 46 for a spent fuel assembly 20 or a canister for consolidated fuel. As will be discussed in detail subsequently, container 40 and basket 42 are fabricated separately, whereupon basket 42 is inserted into container 40 to provide cask 38.

Turning next to FIG. 6, container 40 includes a base element 48 having an upper proportion configured to receive a lid element 50. The cavity 52 provided within element 48 has substantially cylindrical interior walls 54 rising from floor 56, which is substantially horizontal during long-term storage. Elements 48 and 50 include carbon steel portions 58 to which inner cladding layers 60 of stainless steel are affixed. Carbon steel portions 58 are approximately 30 cm thick and served to protect the environment from gamma rays. Layer 60 can be applied to base element 48, for example, by placing element 48 on a turntable and rotating it while welding a continuous spiral path around the interior using stainless steel welding rods, thereby applying a stainless steel surface which completely covers floor 56 and interior walls 54 of element 48. During this cladding operation, excess stainless steel is applied to provide rings 62, 64, 66, 68 and 70, which project slightly into the interior of element 48 for reasons which will be discussed subsequently. After rings 62–70 have been deposited they are machined to provide smooth, cylindrical surfaces.

With continuing reference to FIG. 6, carbon steel portions 58 of elements 48 and 50 are surrounded with a layer about 7.6 cm thick of neutron absorbing material 72, which may be a resin. A suitable resin for use as material 72 is commercially available from BISCO Products, Inc., 1420 Renaissance Drive, Park Ridge, Ill. 60068, under Stock Number N.S.-3. Surrounding material 72 is outer layer 74 of stainless to protect container 40 from the environment. Container 40 also includes cooling fins 76 of carbon steel, preferably treated to protect the carbon steel from chemical attack by the environment. Fins 76 are welded to portion 58 and extend through material 72 and layer 74. In this embodiment container 40 is approximately 4.8 meters high and has an outer diameter of about 2.5 meters, excluding fins 76, and an inner diameter of approximately 1.7 meters. When loaded with spent fuel, cask 38 has a mass of over 100,000 kilograms. Although not illustrated, it is advantageous to affix a pair of trunions at the top and bottom of base element 48 in order to facilitate handling.

Turning next to FIG. 3, basket 42 includes grid assemblies 78, 80, 82, 84 and 86, which are supported in a column by legs 88. Grid assemblies 78–86 are substantially identical, except that their diameters differ slightly for reasons to be discussed subsequently.

Referring next to both FIGS. 4 and 5, the construction of a grid assembly will now be described. Matrix 90 includes plates 92, 94, 96, 98, 100, 102, 104, 106, 108, 110, 112, 114, 116 and 118. These plates are approximately 23 cm high and 2.0 cm thick. The bottom portion of plate 96, for example, includes 5 downwardly oriented slots 120 which extends midway into the plate and which divide the plate into six segments. Similarly, plate 110, for example, has 5 upwardly oriented slots 122. The slots 120 in plate 96 and the slots 122 in plate 110 are about 26.3 cm apart, and it will be apparent that such dimensions provide storage slots 44 which are positioned about 26.3 cm apart, center-to-center. During assembly, plates 94, 96, 98, 100 and 102 are held at right angles to plates 108, 110, 112, 114 and 116, and the slots 120 are then inserted into slots 122, in the manner illustrated by Arrow A, to provide intersections which extend from the tops of the plates to the bottoms. Thereafter the plates are joined by full length fillet welds running along opposite sides of the intersections, so that each intersections is provided with two welds. Fabrication of matrix 90 is completed by welding plates 92 and 104 to the ends of plates 110, 112 and 114 and by welding plates 106 and 118 to the ends of plates 96, 98 and 100.

Turning next to FIG. 7, after matrix 90 is fabricated blocks 124–154 are welded to plates 92–118 to provide matrix 90 with an approximately circular metallic periphery. Matrix 90, with blocks 124–154 attached thereto, is then mounted on a turntable and machined to provide a circular periphery 156 having a top bevel 158 and a bottom bevel 160. Fabrication of the grid assembly is completed by drilling holes 162 through blocks 128, 136, 144 and 152 in order to slidingly accommodate legs 88. It will be apparent that the construction described above provides generally disk-shaped grid assemblies having plates which define twenty four square apertures and having peripheries which are in heat-conducting contact with the plates.

Figure 9:
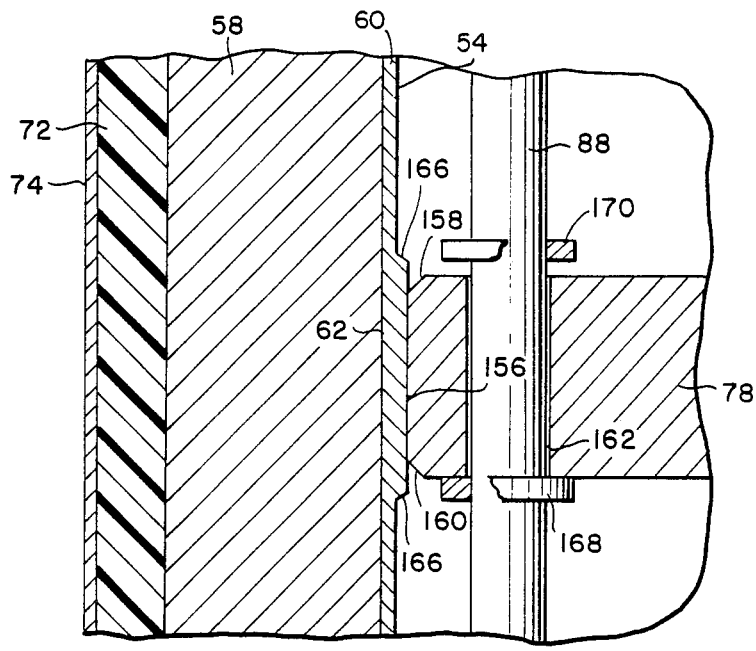
FIG. 9 is a sectional view illustrating the periphery of a grid assembly pressed against its corresponding ring.

With reference next to both FIGS. 3 and 6, the grid assemblies 78–86 of basket 42 are positioned on legs 88 so that they will be level with respective rings 62–70 on wall 54 when the bottoms 164 of legs 88 contact floor 56 of container 40. That is to say, the top grid assembly 78 corresponds to top ring 62 and is supported on legs 88 at a position which aligns the periphery 156 of grid assembly 78 with ring 62 when basket 42 is inserted into container 42. This alignment is illustrated in FIG. 9, wherein it will be noted the rings are provided with bevels 166. Similarly, the second grid assembly 80 corresponds to the second ring 64 and is supported on legs 88 at a position which aligns the periphery 156 of grid assembly 80 with ring 64 when basket 42 is inserted into container 40; the third grid assembly 82 corresponds to the third ring 66 and is supported on legs 88 at a position which aligns the periphery 156 of grid assembly 82 with ring 66 when basket 42 is inserted into container 40; the fourth grid assembly 84 corresponds to the fourth ring 68 and is supported on legs 88 at a position which aligns the periphery 156 of grid assembly 84 with ring 68 when basket 42 is inserted into container 40; and, finally, the bottom grid assembly 86 corresponds to bottom ring 70 and is supported on legs 88 at a position which aligns the periphery 156 of grid assembly 86 with ring 70 when basket 42 is inserted into container 40.

With continuing reference to FIG. 3, grid assemblies 78–86 are supported on legs 88 by bottom rings 168, which are affixed to legs 88. For reasons to be discussed subsequently, top rings 170 are affixed to legs 88 at positions spaced slightly above the upper surfaces of grid assemblies 78–86, the distances between rings 170 and the upper surfaces of the grid assemblies in FIG. 3 being exaggerated for purposes of illustration. It will be apparent that the grid assemblies are confined between their respective bottom and top rings 168 and 170, but each grid assembly is able to move with respect to legs 88 by a distance which is equal to the difference between the thickness of the grid assembly and the spacing between rings 168 and 170.

After assembly of basket 42, it is mounted on a turntable and the peripheries 156 of grid assemblies 78–86 are machined again to ensure that slight manufacturing deviations have not resulted in peripheries that are eccentric with respect to one another. Moreover, the peripheries 156 are machined to slightly different diameters, the diameters decreasing from the top grid assembly 78 of basket 42 to the bottom grid assembly 86. In the preferred embodiment the diameter of grid assembly 78 is approximately 169.875 cm; the diameter of grid assembly 80 is 0.635 cm less than the diameter of grid assembly 78; the diameter of grid assembly 82 is 0.635 cm less than the diameter of grid assembly 80; the diameter of grid assembly 84 is 0.635 cm less than the diameter of grid assembly 82; and the diameter of grid assembly 86 is 0.635 cm less than the diameter of grid assembly 84. Accordingly, it will be apparent that the peripheries 156 of grid assemblies 78–86 define concentric cylinders which have diameters progressively differing by 0.635 cm, and that the diameter of top grid assembly 178 is approximately 2.54 cm greater than the diameter of bottom grid assembly 86.

The plates 92–118, blocks 124–154, and rings 168 and 170 of the basket 42 are made of a metal which conducts heat. In the preferred embodiment aluminum is used for basket 42, although other metals such as copper would also be suitable.

The storage slots 44 provided by basket 42 can be used for storing fuel assemblies 20 or for storing spent fuel in consolidated form, or both simultaneously. In such consolidated storage, the rods 26 are removed from the fuel assemblies 20 and placed in a consolidation canister which holds a greater number of fuel rods than the number in a single fuel assembly. In order to prepare cask 38 for consolidated storage, assembly 42 is inserted into container 40, as will be described subsequently, and consolidation canisters loaded with spent fuel are transferred under water to storage slots 44. If one or more storage slots 44 are to be devoted to the storage of fuel assemblies 20, however, these storage slots are provided with cells for receiving the fuel assemblies 26 before assembly 42 is inserted into container 40.

Turning next to FIGS. 10 and 11, a cell 46 will now be described. Shell element 174, of stainless steel about 0.19 cm thick, has four elongated sides defining a region having a square cross section sufficiently large to accommodate a fuel assembly 20. The cross sectional area is determined by the dimensions of the particular fuel assembly design, so as to provide a snug fit. The bottom end of 176 of element 174 is open and the top end of element 174 is provided with outwardly bent flanges 178 which serve to funnel the fuel assembly 20 into cell 46. Stainless steel wrapper portions 180, about 0.08 cm thick, are welded to shell element 174 in order to support sheets 182 of a "neutron poison" such as boron carbide. Sheets 182, which are about [0.19] cm thick, are present to moderate neutrons emitted from fuel assemblies 20 when cask 38 is in pool 30 while the fuel assemblies are being loaded into it. That is to say, sheets 182 serve to maintain the criticality factor $K_{eff}$ at less than one in order to obviate the possibility of a self-sustaining chain reaction while cask 38 contains both water and fuel assemblies 20. Sheets 182 limit the nuclear interaction between fuel assemblies which are, of course, designed to promote chain reactions when they are present in a reactor. In fact, neutron poison is unnecessary when consolidated fuel is stored. It is worth noting that sheets 182 have served their purposes after the water has been drained from cask 38 during the loading process, since water thermalizes neutrons and, after drainage, the potential for a chain reaction is reduced.

Figure 12:
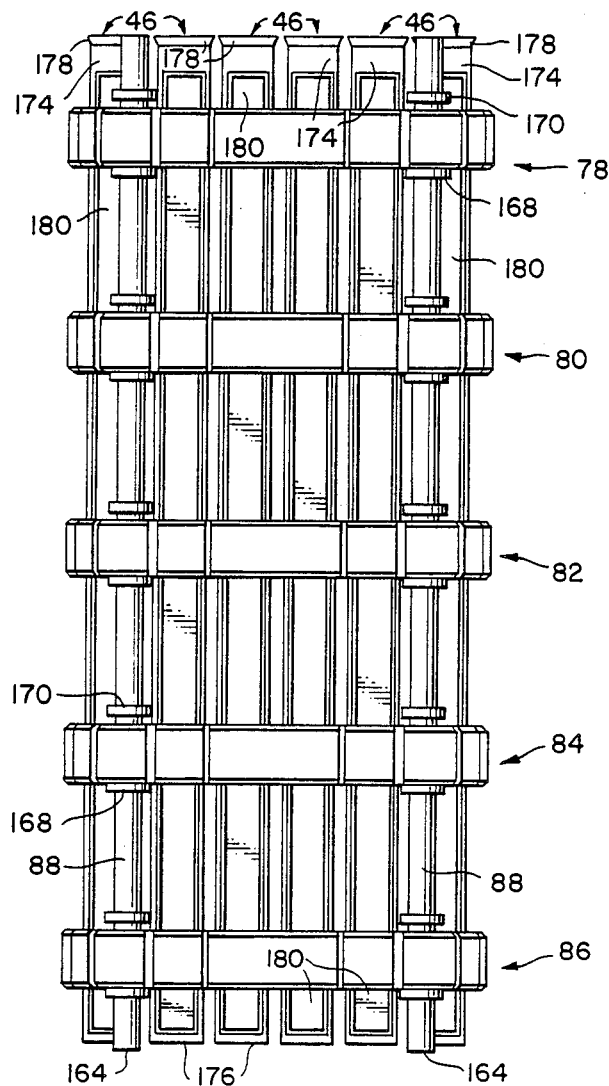
FIG. 12 is a front elevational view of a basket with cells affixed therein.
Figure 14:
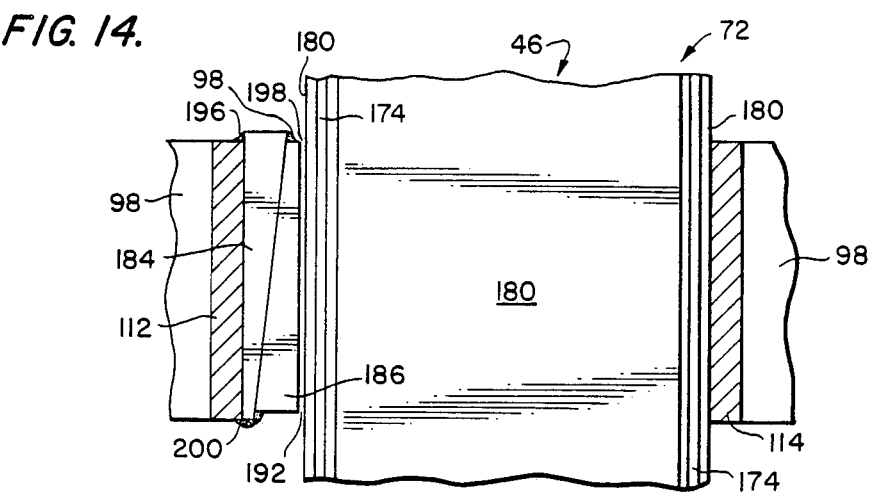
FIG. 14 is a sectional view taken along the line 14—14 in FIG. 13.

Turning next to FIGS. 12, 13 and 14, the mounting of cells 46 in the storage slots 44 provided by basket 42 will now be described. Each cell 46 is fastened, for example by welding, to the bottom grid assembly 86. The bottom ends 176 of cells 172 are disposed slightly above the bottoms 164 of legs 88 in order to facilitate water drainage. The cells 46 are not fixedly attached to the remaining grid assemblies 78, 80, 82, and 84, since otherwise differential expansion of the cells 46 with respect to basket 42, as the temperature within cask 38 rises following drainage of the water, would create appreciable strains in the structure which might lead to unacceptable performance. Instead of fastening cells 46 to grid assemblies 78-84, heat conducting wedges are used to position the cells within grid assemblies 78-84 while nevertheless permitting the cells to move axially with respect to the grid assemblies. In order to avoid an electrolytic reaction the wedges are preferably made of the same metal, such as aluminum or copper, as the plates 92-118 of grid assemblies 78-84. For example FIG. 13 illustrates a top view of a portion of grid assembly 78 and a cell 46, illustrated for the sake of clarity without its flanges 178. In FIG. 13 it will be apparent that one side of the cell 46 slidably rests against plate 98 and another side slidably rests against plate 114. The other sides of the cell 46 receive lateral support by means of wedges 184, 186, 188, and 190, with a narrow gap 192 being left between wedge 186 and cell 46 and with a narrow gap 194 being left between wedge 188 and cell 46. Gaps 192 and 194 are exaggerated in FIG. 13 for purposes of illustration.

The installation of wedges 184 and 186, for example, is illustrated in FIG. 14. After cell 46 is inserted into the storage slot 44, wedge 184 is affixed to plate 112 by fillet weld 196. Wedge 186 is then inserted and, using a feeler gauge, gap 192 is adjusted to provide a predetermined spacing between wedge 186 and cell 46 when cask 38 reaches its maximum temperature, such as 375° C., during storage of spent fuel. This predetermined gap thickness preferably ranges from about 0.005 cm to 0.025 cm. After the gap adjustment, wedge 186 is affixed to wedge 184 by fillet weld 198, and weld 200 is applied to join plate 112, wedge 184, and wedge 186. In the same way, wedges 188 and 190 are adjusted and welded to provide gap 194, preferably also ranging from 0.005 cm to 0.025 cm wide. The remaining cells 46 are, of course, wedged into the apertures provided by grid assembly 78, and into the apertures provided by grid assemblies 80, 82, and 84, in the same manner.

After cask 38 is loaded with fuel assemblies 20 and drained of water it is preferably flooded with an inert gas, such as helium or nitrogen, although air may be employed instead. Helium, in particular, readily transmits heat through narrow gaps such as gaps 192 and 194. Accordingly, it will be apparent that heat from a cell 46 is directly transmitted to the plates of a grid assembly via the two sides of the cell which contact the plates, and indirectly via gaps 192 and 194 and wedges 184-190 to the remaining plates. Gaps 192 and 194 are sufficiently narrow to prevent cells 46 from rattling around within basket 42 during manufacture, loading, and transportation of cask 38 to a remote storage location. Gaps 192 and 194 also, as indicated previously, serve to permit linear movement of cells 46 with respect to basket 42 during temperature changes. This differential linear expansion of cells 46 with respect to basket 42 can amount to 2 centimeters or more within the range of temperatures encountered during and after the insertion of fuel assemblies into cells 46. Moreover, wedges 184-190 position cells 46 within assembly 42 and ensure a cell-center to cell-center spacing, in the present embodiment, of about 26.2 cm. This uniform spacing, in addition to poison sheets 82, ensures that the credicality factors $K_{eff}$ remains less than 1 before the water is drained from cask 38.

From the previous discussion it will be recalled that the top grid assembly 78 has a diameter of 169.875 cm in the preferred embodiment, and that the remaining grid assemblies 80-86 have decreasing diameters. Rings 62-70 in container 40 are also machined to have different diameters. In the preferred embodiment top ring 62 has a diameter of approximately 170.18 cm, that is, approximately 0.305 cm greater than the diameter of grid assembly 78. The diameter of ring 64 is 0.635 cm less than the diameter of ring 62; the diameter of ring 66 is 0.635 cm less than the diameter of ring 64; the diameter of ring 68 is 0.635 cm less than the diameter of rings 66; and the diameter is reduced by 0.635 cm again for bottom ring 70. Thus, rings reduced by 0.635 cm again for bottom ring 70. Thus, rings 62-70, like the peripheries 156 of grid assembly 78-86, defined concentric cylinders having a common axis and diameters differing by 0.635 cm. Moreover, the diameter of each ring 62-70 is, when container 40 and basket 42 are being fabricated at normal shop temperatures, 0.305 cm greater than the diameter of the corresponding grid assembly 78–86.

The stepped diameters of grid assemblies 78–86 and rings 62–72 facilitate insertion of basket 42, after cells 46 had been wedged into place in the manner previously described, into container 40. Assembly 42 and the cells 46 are relatively massive and the fit between assembly 42 and container 40 is relatively tight, so that a slight axial misalignment between container 40 and assembly 42, or a slight longitudinal displacement of container 40 with respect to assembly 42, might cause assembly 42 to jam, or become lodged within container 40 before it is fully inserted, were it not for the stepped diameters. During the initial stages of the insertion operation, as assembly 42 and the cells 46 mounted therein are suspended over container 40 and are being lowered into it, the difference in the diameters of grid assembly 86 and ring 62 provides over 1.5 cm clearance as assembly 86 passes ring 62. This clearance can be visually checked and any misalignment can be corrected. When basket 42 is lowered further into container 40, there is about 1.22 cm clearance between grid assembly 86 and ring 64 and between grid assembly 84 and ring 62. These clearances can be visually checked again, and any asymmetries corrected. Due to the stepped diameters it is not until grid assembly 86 is lowered to ring 70 that the diametrical differences become 0.305 cm. Thus, the stepped diameters of ring 62–70 and of grid assemblies 78–86 not only facilitate monitoring of the insertion process, they also effectively multiply the tolerance for inaccuracy throughout most of the insertion process. It should also be noted that bevels 158 and 160 of grid assemblies 78–86 and bevels 166 of rings 62–70 also reduce the likelihood that basket 42 will jam within container 40 when basket 42 is being inserted or removed. Such removal might be necessary, for example, should basket 42 lodge in container 40 before it is fully inserted. FIG. 15 illustrates cask 38 after basket 42 with cells 172 is fully installed in container 40.

An operational summary of cask 38 can now be presented. Cask 38 is opened and lowered to cask pad 36 of pool 30, and fuel assemblies 20 are transferred to cells 46. After lid element 50 is bolted into place, gas is introduced into cask 38 as water is being drained. The temperature within cask 38 rises as the water is drained, so that a long drying time is not necessary. As the temperature within cask 38 rises, grid assemblies 78–86 expand radially and the 0.305 cm diameter difference between grid assemblies 78–86 and their respective rings 62–70 disappears as result of differential expansion between assembly 42 and container 40. The peripheries 156 of grid assemblies 78–86 are pressed against their respective rings 62–70 to provide heat flow paths between assembly 42 and container 40. For example, FIG. 9 illustrates grid assembly 78 pressed against its corresponding ring 62 when the interior of cask 38 reaches its equilibrium temperature. It should be noted that this differential expansion of grid assemblies 78–86 into contact with their corresponding rings 62–70 is a self-correcting feature. Consider, for example, the situation if the equilibrium temperature were to change during spent fuel storage so as to separate the grid assemblies 78–86 from their respective rings 62–70. Such a separation would impede heat transfer from grid assembly 78–86 to rings 62–70, and thence to the environment. This in turn would raise the temperature of grid assemblies 78–86, pressing them again against their corresponding rings 62–70 so as to reestablish the heat-conducting relationship at a new equilibrium temperature.

At thermal equilibrium grid assemblies 78–86 interfere with rings 62–70 in the sense that their diameters would overlap were they not pressing against each other. This condition may be deemed "diametral interference" and results in stress where the peripheries 156 of grid assemblies 78–86 contact the surfaces of rings 62–70. With the cask dimensions given, and assuming that the difference in diameters of grid assemblies 78–86 with respect to rings 62–70 is initially 0.305 cm, with a manufacturing tolerance of plus or minus 0.038 cm, at thermal equilibrium the diametral interference ranges from about 0.0305 cm to about 0.107 cm when cask 38 contains 24 spent fuel assemblies 20, each generating a kilowatt of heat. The resulting stress ranges from about 1,000–4,000 PSI (69 million–276 million dyes/cm$^2$). It has been determined experimentally that the contact temperature differences between stainless steel and aluminum at these pressures range from approximately 0° C. to 1.7° C.

Cask 38 could be modified by replacing rings 62–70 with vertically disposed tracks affixed to walls 54 and by affixing corresponding tracks at the periphery of basket 42. The tracks would preferably be tapered to facilitate insertion. However, the use of vertical tracks rather than horizontal rings would tend to complicate manufacture.

Another alternative would be to manufacture basket 42 so that the diameters of grid assemblies 78–86 are the same as or slightly larger than the diameters of rings 62–70. Under this alternative container 40 would be heated and/or basket 42 would be chilled, as by frozen $CO_2$, prior to the insertion operation. Basket 42 would then be tightly fitted to container 40 when the elements are returned to normal shop temperature. This alternative would exclude borated water from the interface between grid assemblies 78–86 and rings 62–70, thus ensuring that contaminants do not enter this interface to degrade heat flow.

From the foregoing discussion it will be apparent that the spent fuel storage cask of the present invention provides a basket formed of grid assemblies which define storage slots for receiving spent fuel and which, after the basket is inserted into the container, expand to provide heat-conducting interfaces between the grid assemblies and the walls of the container. Although the foregoing discussion has described the preferred embodiments with reference to pressurized water reactors, in which case the water in pool 30 would be borated, it will be apparent to those skilled in the art that the present invention could be used with spent fuel from a boiling water reactor.

It will be understood that the above description of the present invention is susceptible to various modifications, changes, and adaptations, and the same are intended to be comprehended within the meaning and range of equivalence of the appended claims.

We claim:

1. A cask for storage of nuclear fuel, comprising:
   a container having a cavity therein, the cavity including a top portion, a bottom portion defining a floor, and a generally cylindrical side wall extending between the top and bottom portions, the side wall having a plurality of annular regions with different inner diameters; and
   basket means for providing a plurality of elongated storage slots to receive the nuclear fuel, said basket means including a plurality of grid assemblies with circular peripheries and different diameters, and means for coaxially mounting said grid assemblies at spaced-apart positions so that the periphery of each grid assembly faces a respective annular region, said grid assemblies being dimensioned to permit insertion of said basket means into said cavity and to expand into pressing contact with said annular regions during storage of the nuclear fuel in order to facilitate the transfer of heat from said basket means through the peripheries of said grid assemblies to said annular regions, the pressing contact extending for 360° about the periphery of each grid assembly, wherein the diameters of said grid assemblies and the inner diameters of said annular regions decrease from the top portion to the bottom portion of said container.

2. The cask of claim 1, wherein each grid assembly comprises a plurality of plates connected to one another to form a matrix having rectangular apertures, the apertures of said grid assemblies being aligned to provide said storage slots, and a plurality of block elements affixed to said plates to form said periphery.

3. The cask of claim 2, wherein a plurality of the metal plates of each grid assembly have holes therein, and wherein said means coaxially mounting said grid assemblies comprises legs extending through said holes and, for each plate having a hole, a bottom ring affixed to a leg on one side of the hole and a top ring affixed to the leg on the other side of the hole, the distance between said top and bottom rings being greater than the thickness of the block having the hole so that said block having the hole is slidably confined between said top and bottom rings.

4. The cask of claim 2, further comprising means disposed in said storage slots for enclosing the nuclear fuel.

5. The cask of claim 4, wherein said means disposed in said storage slots comprises four-sided cells, each side having a sheet of neutron poison material affixed thereto, and further comprising heat conducting means affixed to said plates for positioning said cells in said storage slots.

6. The cask of claim 5, wherein for each cell said heat conducting means comprises wedges disposed adjacent two walls of the cell and spaced apart from the walls of the cell.

7. The cask of claim 6, wherein said wedges are spaced apart from said cell wall by gaps ranging from about 0.005 cm to about 0.025 cm.

8. The cask of claim 7, wherein said cask is flooded with gas.

9. The cask of claim 8, wherein said gas comprises helium.

10. The cask of claim 1, wherein said annular regions are rings which project into said cavity.

11. The cask of claim 10 wherein the difference between the diameters of adjacent grid assemblies is constant and the difference between the diameters of adjacent rings is constant.

12. The cask of claim 11, wherein at a predetermined temperature the diameter of each grid assembly is less than the diameter of the corresponding ring by a constant amount.

13. The cask of claim 12, wherein the difference in the diameters of adjacent grid assemblies and rings is approximately 0.6 cm and at the predetermined temperature the diameter of each grid assembly is less than the diameter of its corresponding ring by approximately 0.3 cm.

14. The cask of claim 10, wherein the width of each ring is greater than the thickness of the corresponding grid assembly.

15. The cask of claim 10, wherein said rings and grid assemblies have beveled edges.

16. The cask of claim 1, wherein the pressing contact between said peripheries of said grid assemblies and said annular regions of said wall is at least about 1000 pounds per square inch.

17. The cask of claim 1, wherein the pressing contact between said peripheries of said grid assemblies and said annular regions of said wall is not greater than about 4000 pounds per square inch.

18. A cask for storage of nuclear fuel, comprising:
a container having a cavity therein, the cavity including a top portion, a bottom portion, and a generally cylindrical side wall extending between the top and bottom portions, the side wall having a plurality of annular regions with different inner diameters; and
basket means for providing a plurality of elongated storage slots to receive the nuclear fuel, said basket means including a plurality of spaced-apart protrusions having circular peripheries that are coaxially disposed and having different diameters, each protrusion facing a respective annular region, said protrusions being dimensioned to permit insertion of said basket means into said cavity and to expand into pressing contact with said annular regions during storage of the nuclear fuel in order to facilitate the transfer of heat from said basket means through the peripheries of said protrusions to said annular regions, the pressing contact extending for 360° about the periphery of each protrusion, wherein the diameters of said protrusions and the inner diameter of said annular regions decrease from the top portion to the bottom portion of said container.

19. The cask of claim 18, wherein said annular regions are rings which project into said cavity.

* * * * *